United States Patent
Celinder et al.

(10) Patent No.: US 11,065,899 B1
(45) Date of Patent: Jul. 20, 2021

(54) METHODS, APPARATUSES, AND SYSTEMS FOR BATCH PRINT VOIDING

(71) Applicant: Datamax-O'Neil Corporation, Altamonte Springs, FL (US)

(72) Inventors: Thomas Axel Jonas Celinder, Singapore (SG); Cheng Khoon Ng, Singapore (SG); Sze Ping Ching, Singapore (SG); Harry Nicholas Makabali Lansangan, Singapore (SG)

(73) Assignee: DATAMAX-O'NEIL CORPORATION, Altamonte Springs, FL (US)

( * ) Notice: Subject to any disclaimer, the term of this patent is extended or adjusted under 35 U.S.C. 154(b) by 0 days.

(21) Appl. No.: 16/731,863

(22) Filed: Dec. 31, 2019

(51) Int. Cl.
*B41J 29/393* (2006.01)

(52) U.S. Cl.
CPC .................. *B41J 29/393* (2013.01)

(58) Field of Classification Search
CPC ........................................ B41J 29/393
USPC ........................................ 347/16
See application file for complete search history.

(56) References Cited

U.S. PATENT DOCUMENTS

| | | | |
|---|---|---|---|
| 5,564,841 A * | 10/1996 | Austin | B41J 2/36 347/188 |
| 9,481,186 B2 | 11/2016 | Bouverie et al. | |
| 10,250,768 B2 | 4/2019 | Conlon et al. | |
| 2006/0221111 A1 * | 10/2006 | Ouchi | B41J 11/003 347/16 |
| 2011/0292435 A1 | 12/2011 | Cok et al. | |

FOREIGN PATENT DOCUMENTS

| | | |
|---|---|---|
| EP | 3336770 A1 | 6/2018 |
| EP | 3373189 A1 | 9/2018 |
| EP | 3509287 A1 | 7/2019 |

OTHER PUBLICATIONS

Extended European Search Report issued in European Application No. 20216244.2 dated Apr. 22, 2021, 7 pages.

* cited by examiner

*Primary Examiner* — Huan H Tran
*Assistant Examiner* — Alexander D Shenderov
(74) *Attorney, Agent, or Firm* — Alston & Bird LLP

(57) ABSTRACT

Various methods and systems for a printer having verifiers are disclosed herein. Such methods provide for voiding a printed media in a batch printing run. The methods further correspond to identifying the printed media that is printed as part of the batch printing run as a failed media in an instance an assigned grade fails to satisfy a predetermined threshold, marking the printed media as a failed printed media, determining one or more subsequently printed media that were printed after the failed printed media, and reprinting the printed failed media in a next available media after the one or more subsequently printed media.

20 Claims, 7 Drawing Sheets

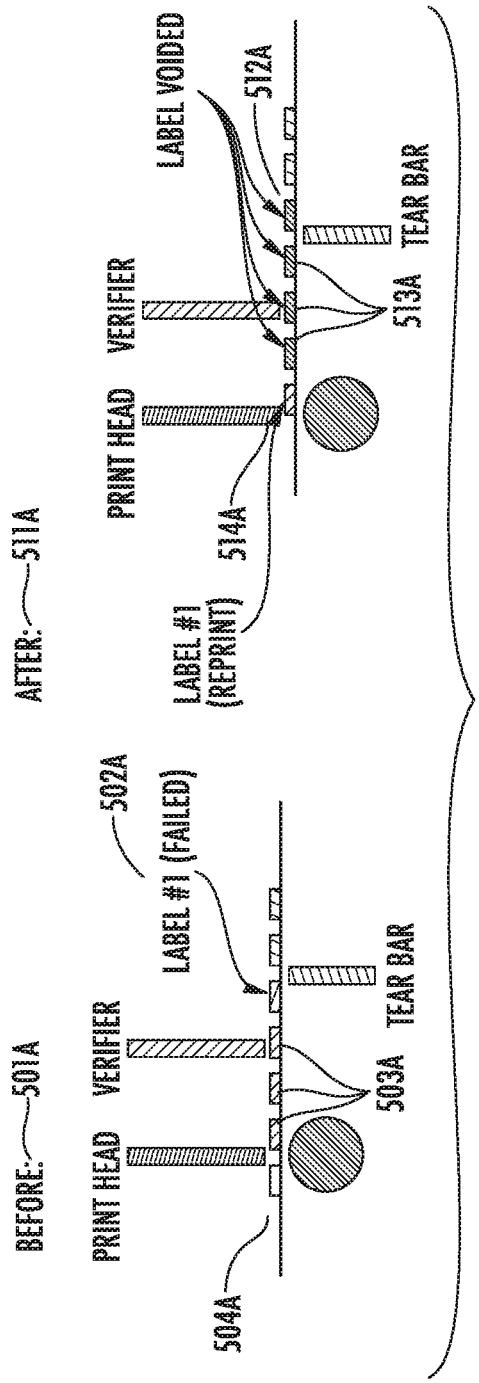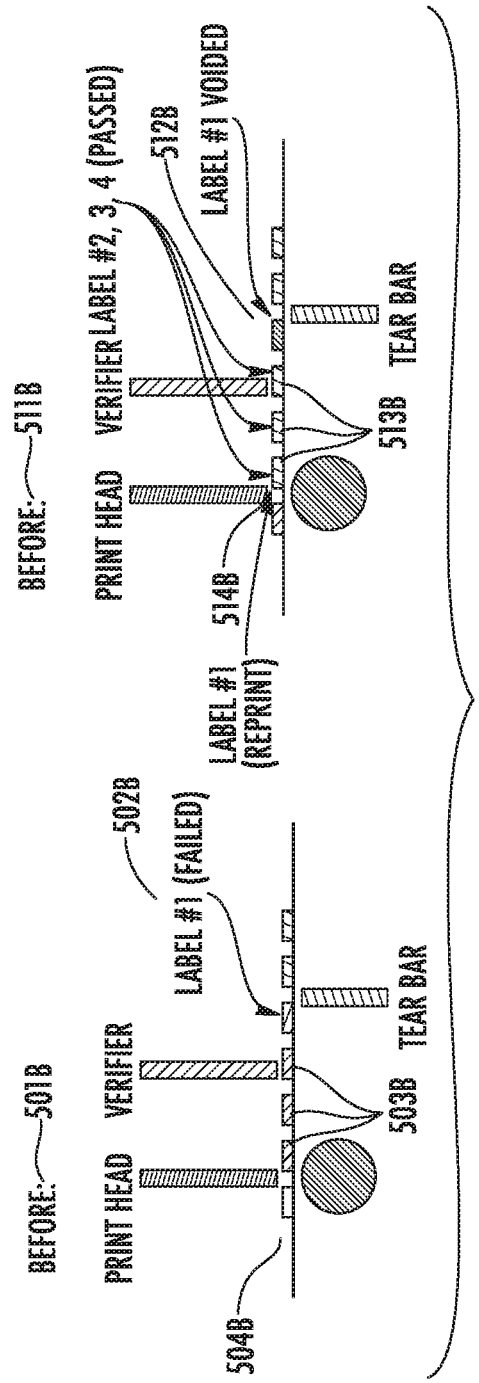

METHODS, APPARATUSES, AND SYSTEMS FOR BATCH PRINT VOIDING

FIELD OF THE INVENTION

Example embodiments relate to printers, printing, printed image verification, and voiding. More particularly, the present method and apparatus provides robust printed image verification and void printing in a batch printing run.

BACKGROUND

Notwithstanding the revolution in digital communications and digital transmission/viewing of documents, hardcopy printed media—printing onto tangible sheets of paper or labels—remains essential for many purposes. Hardcopy printing may be accomplished via multiple types of devices, including thermal printers, inkjet printing, and laser printers. For all hardcopy media and printing methods, an important objective is a high level of visual clarity of the final printed output. When a document is intended for conventional, narrative text or images to be read/viewed by a person, visual clarity ensures the document is both readable and aesthetically appealing. Applicant has identified many deficiencies and problems associated with existing printers.

BRIEF SUMMARY

In some examples, the systems and methods disclosed herein solves one or more problem via computer software which controls a hardware processor of the printer. Under software control, the hardware processor is configured to identify a printed media that is printed as part of a batch printing run as a failed media in an instance an assigned grade fails to satisfy a predetermined threshold. The hardware processor is further configured to mark the printed media as a failed printed media and determine one or more subsequently printed media that were printed after the failed printed media. The hardware processor is then configured to reprint the failed printed media in a next available media after the one or more subsequently printed media.

The method, in some examples, also employs the hardware processor to scan, with an inspection device, the printed media to generate at least a portion of a printed image and determine the assigned grade for the at least a portion of the printed image. The method then marks the one or more subsequently printed media as additional failed printed media and reprints the additional failed printed media in sequence after the failed printed media. In an embodiment, the at least a portion of the printed image comprises a bar code.

The method is further configured to detect barcode symbols of the at least a portion of the printed image to obtain a scan reflectance profile and calculate, using the scan reflectance profile, a grade against a plurality of quality parameters comprising a decode parameter, symbol contrast, minimum reflectance, edge contrast, modulation, defects, and decodability.

In some embodiments, the method is further configured to determine a count of the printed media that is printed and identify the one or more subsequently printed media based on the count of the printed media that is printed.

In accordance with various embodiments, a method for determining a distance between a print head and the inspection device is provided. The method further determines a media size and identifies the one or more subsequently printed media based on the distance between the print head and the inspection device and the media size.

In some embodiments, marking the printed media as a failed printed media comprises printing a voiding pattern over or adjacent to the at least a portion of the printed image, wherein the voiding pattern is configured to render the at least a portion of the printed image unreadable by an automated reading device while only minimally obscuring the at least a portion of the printed image for visual inspection.

BRIEF DESCRIPTION OF THE DRAWINGS

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 5A and 5B depict schematic views of some internal operating elements of an exemplary printer, including a print head, verifier, and tear bar, according to various example embodiments.

DETAILED DESCRIPTION OF THE INVENTION

Figure 1A:
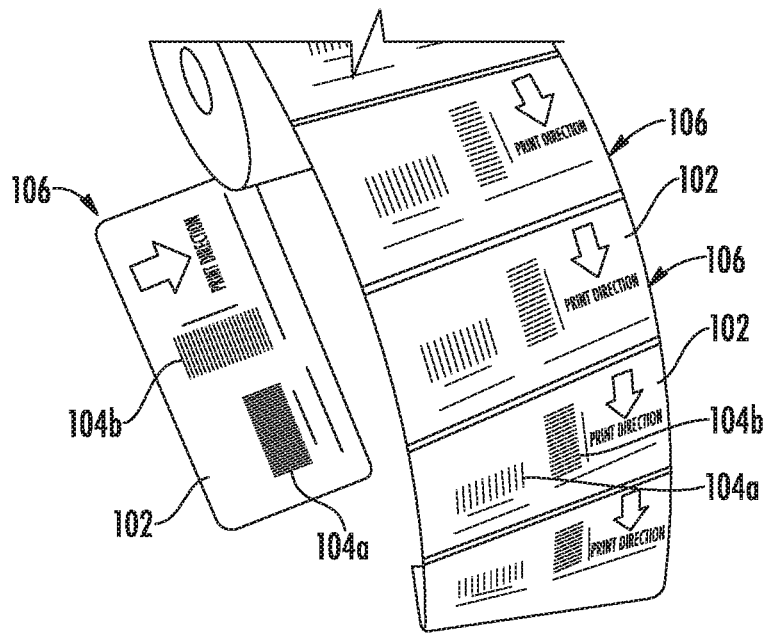
FIG. 1A depicts a plurality of exemplary printed barcodes on print media.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

Various example embodiments will be described in relation to a thermal transfer printer. However, the examples herein may be equally applicable to other types and styles of printers (inclusive of printer-verifiers) (e.g., a thermal direct printer, a laser toner printer, an ink drop printer, etc.).

The headings provided herein are for convenience only and do not limit the scope or meaning of the claimed invention.

I. Definitions and Overview

Quality of printed document may be assessed to identify printing problems. For example, example embodiments may scan a printed document or printed media after the printing process is complete, and identify errors in the final output. In some examples, the so-called errors may be related to verification of decodable indicia (e.g., barcodes) whereas in other examples so-called errors may relate to overlap of printed subject matter, printing errors, illegible text, and/or the like.

Various example embodiments provide systems and methods for a printer to mark a printed media as a failed printed media, determine one or more subsequently printed media after the failed print media, and reprint the failed printed media in sequence after the one or more subsequently printed print media, such as on the next available print media. In some examples, by allowing for the failed printed media, and in some examples a series of failed printed media, to be reprinted provides maximum throughput when batch printing.

In some examples, by voiding a printed media and any subsequently printed media, the printer may reprint the failed printed media and the subsequently printed media in the proper sequence so as to enable ease of application, increased throughout, and/or reduce errors. For example, in operations where print media is to be applied to packages in order or in a sequence, the overall throughput of the packages may, in some examples, be increased based on the sequential batch printing disclosed herein.

The terms "print media," "physical print media," "paper," and "labels" refer to tangible, substantially durable physical material onto which text, graphics or images may be imprinted and persistently retained over time.

The term "printed media" refers to when a paper or label has been imprinted by the printer. In other words, the print media is labeled (e.g., imprinted with an image).

Physical print media are used for personal communications, business communications, to convey prose expression (including news, editorials, product data, academic writings, memos, and many other kinds of communications), data, advertising, fiction, entertainment content, and illustrations and pictures.

Physical print media are generally derivatives of wood pulp or polymers, and includes conventional office paper, clear or tinted acetate media, news print, envelopes, mailing labels, product labels, and other kinds of labels. Thicker materials, such as cardstock or cardboard may be included as well. More generally, print media is used to receive ink, dye, or toner, or is a media whose color or shading can be selectively varied (for example, through selective application of heat, light, or chemicals) to create a persistent visual contrast (in black and white, shades of gray, and/or colors) that can be perceived by the human eye as text, images, shapes, symbols, or graphics.

In exemplary embodiments discussed throughout this document, reference may be made specifically to "paper" or "labels;" however, the operations, system elements, and methods of such exemplary applications may be applicable to media other than or in addition to the specifically mentioned "paper" or "labels."

A "printer" is a device which imprints text, images, shapes, symbols, or graphics onto print media to create a persistent, human-readable representation of the text, images, shapes, symbols, or graphics. Printers may include, for example, laser printers, light-emitting diode (LED) printers, inkjet printers, thermal printers, dot matrix printers, impact printers, and line printers.

Generally, printers are designed so that one or more sheets of paper, one or more labels, or other print media can be inserted or "fed" into the printer. For example, multiple sheets or other media can be inserted into a holding tray or other container element of the printer for temporary storage. In alternative or additional embodiments, individual sheets of print media may be hand-fed into a printer one at a time. Command and content instructions are then sent to the printer electronically, for example, from an external computer that is communicatively linked to the printer. The printer feeds a sheet of paper, or a label, or other print media into itself and towards a printhead within the printer. The printhead of the printer then imprint the appropriate contents onto the print media.

Figure 2A:
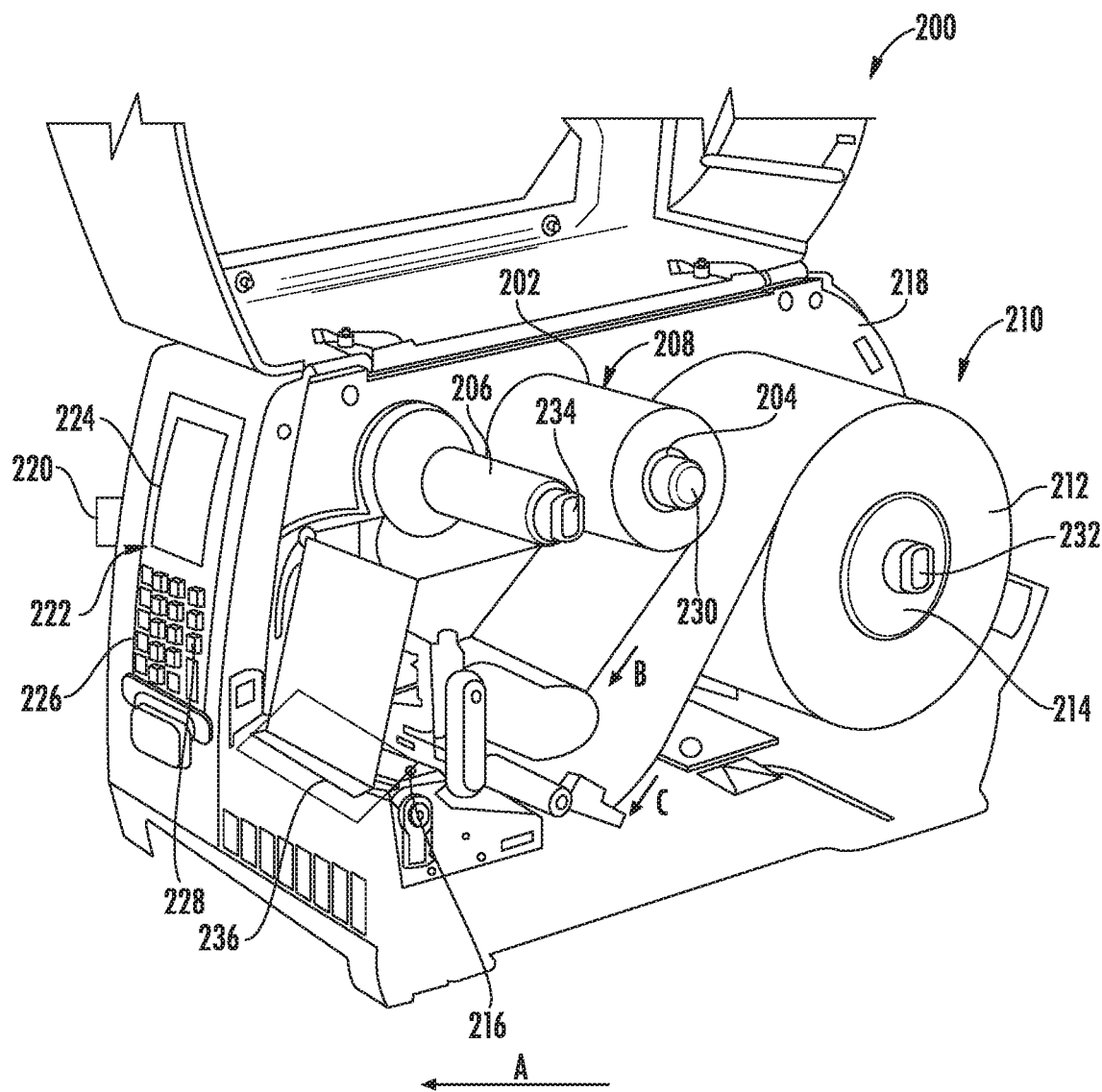
FIG. 2A graphically illustrates a portion of an exemplary printer-verifier (a cover of the printer-verifier removed) to illustrate an interior thereof, according to various example embodiments.
Figure 2B:
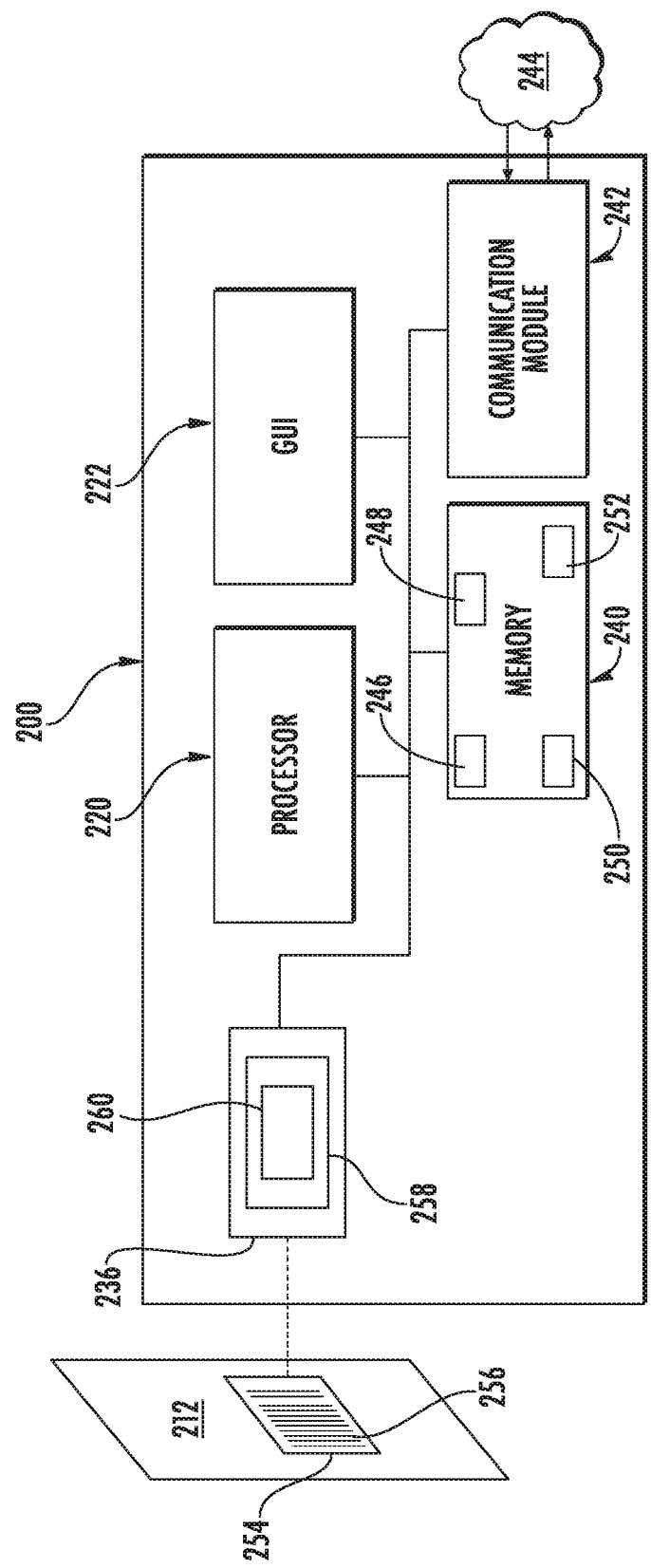
FIG. 2B schematically depicts a block diagram of the printer-verifier of FIG. 2A, according to various example embodiments.
Figure 3:
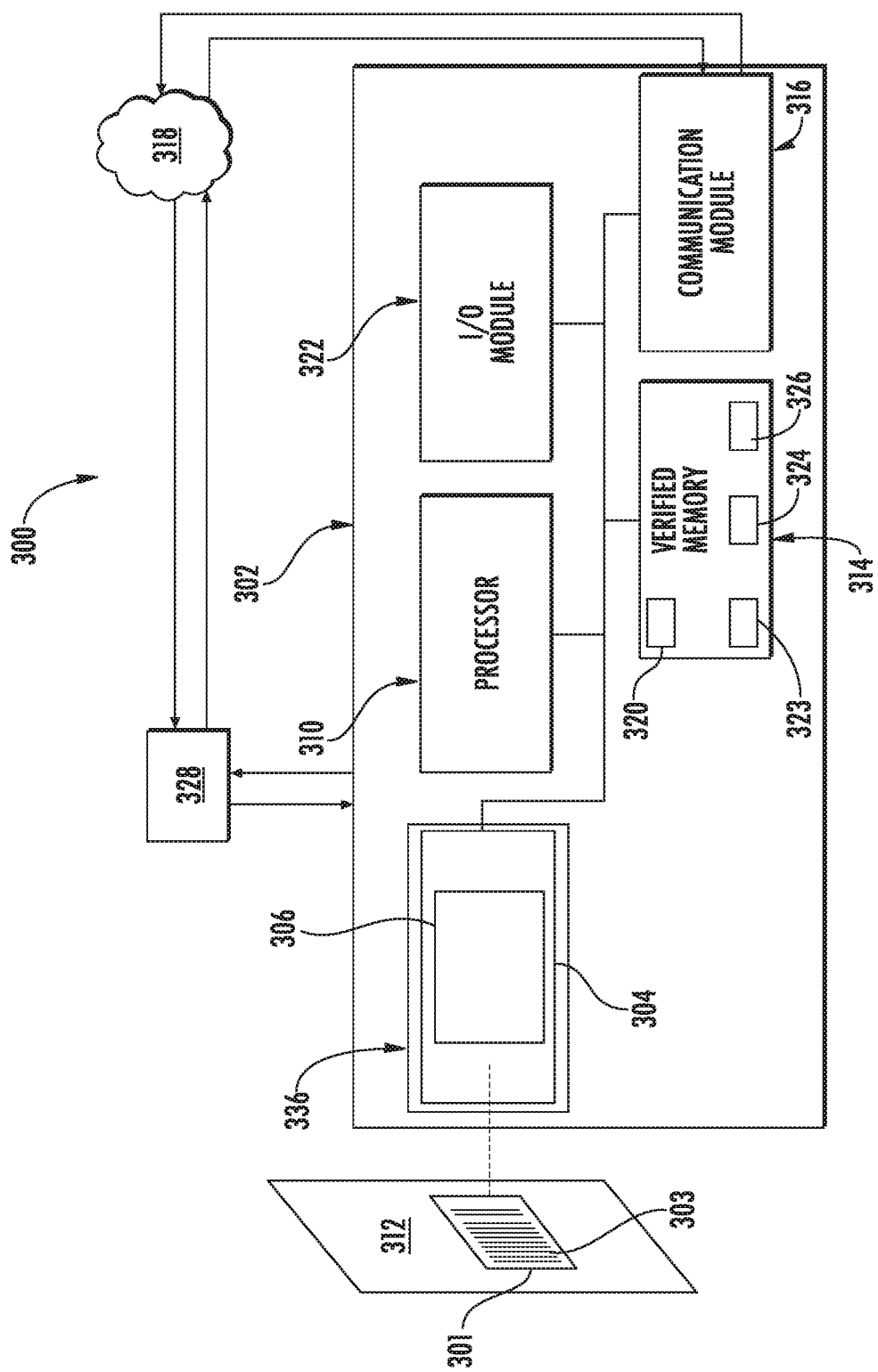
FIG. 3 schematically depicts an exemplary printer communicatively coupled to a verifier in a system for printing an image and verifying a print quality of the image, according to various example embodiments.

Further, the term "printer" refers to both a printer-verifier (in which a printer and verifier are integrated in a single device) such as exemplified in FIGS. 2A-2B and a separate printer as exemplified in FIG. 3. As depicted in FIG. 3, and hereinafter described, the separate printer 328 may be communicatively coupled to a verifier 302 in a system 300 for printing an image and verifying a print quality of the image. The verifier 302 may be attached to the printer 328 or may be a standalone device to where the user brings the printed image from the printer for verifying the print quality of the image printed on the print medium. The terms "verifier" and "inspection device" refer to the same device.

As depicted in FIGS. 2A-2B, printer-verifier 200 is configured for both printing the image and verifying a print quality of the image printed on print medium, as hereinafter described. Printer-verifier 200 is configured for printing the image and a verifier within the printer-verifier 200 is configured for verifying the print quality of the image printed on print medium. As used herein, the "image" may be text, a line, a box, a symbol, a barcode, optical character recognition (OCR) text, etc.

In an example, printers may comprise verifiers or communicably coupled with standalone verifiers that determine, in a verification process, whether the machine-readable symbol meets print quality standards. However, in some examples, if an issue with print media is detected by the verifier, the printer is stopped until a solution can be found. Not only can this process be time consuming, but also a user must get involved to resolve the issues. For example, the user may need to remove defective labels and separate them from properly printed labels. Also, the user may need to reboot the printer and/or manually change printer settings. In another example, verifiers may support printing in batch mode, but do not have the ability to void defective media or print media that is assigned a grade that does not satisfy a threshold. In this case, the printing throughput is high but requires the user to manually interact with the printer to remove defective or failed print media. Indeed, in some examples, a user may be required to process the labels out of sequence.

In addition and in some examples, printers may fail to provide maximum printing throughput when a defective label is detected. For example, each label is printed, verified, and potentially voided before the next (e.g., subsequent) label starts to print. In these situations, overall printing throughput is low. None of existing printers have been successful in reliably and consistently batch printing images and voiding images at the same time.

II. Example Apparatus for Implementing Example Embodiments

Example embodiments may be implemented as apparatus and systems for verifying printed image and improving print quality.

The present system and method is applicable to different kinds of printers, including but not limited to laser printers, LED printers, inkjet printers, thermal printers, dot matrix printers, and others. For convenience, an exemplary laser printer is illustrated and discussed in some exemplary embodiments below, and these embodiments can be employed on other kinds of printers as well.

A. Print Media and Machine-Readable Indicia

Figure 1B:
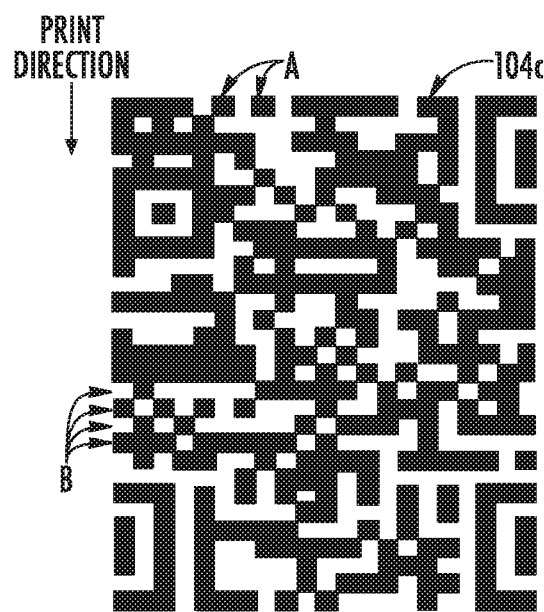
FIG. 1B depicts an exemplary printed barcode.

Referring to FIGS. 1A and 1B, an exemplary print media 102 is shown according to various example embodiments. On the exemplary print media 102, machine-readable indicia (e.g. barcodes 104a and 104b) may be printed to create a printed media 106.

In some examples and in FIG. 1A, a printed media may comprise one or more one-dimensional bar codes. As illustrated in FIG. 1A, a printed barcode 104a may comprise a one-dimensional barcode having bars parallel to the direction of the print media through the printer and a printed bar code 104b may comprise a one-dimensional barcode having bars perpendicular to the direction of the print media through the printer. In some examples and in FIG. 1B, a two-dimensional printed barcode 104c (a QR Code) is shown. The two-dimensional printed barcode 104c, in some examples, incorporates both vertical and horizontal dimensions.

As is described herein, an example printer-verifier is configured to monitor the quality of the printed media 102, comprising one or more one-dimensional barcodes, two-dimensional barcodes and/or other decodable indicia, as it is printed onto print media. As described herein, an example printer-verifier is configured to analyze the print quality to determine if the print quality meets predetermined quality standards. In some examples and when the example printer-verifier determines that the print quality does not meet the predetermined quality standards, example printer-verifier may instruct the printing mechanism to mark a printed media as a failed printed media and to reprint the failed printed media in accordance with the batch sequential or non-sequential example methods described herein.

B. Printer and Printer with Verifier/Scanner

Referring now to FIGS. 2A-2B, an exemplary printer-verifier 200 capable of printing on print media 212 is partially shown. The depicted printer-verifier 200 of FIG. 2A has a body 218 for enclosing an interior thereof. The printer-verifier 200 further comprises a power source and a moveable cover for accessing the interior and any components therein.

In various embodiments, the printer-verifier 200 is a thermal transfer printer-verifier that includes a ribbon supply spindle 230 contained within the body 218. A ribbon supply roll 208 is configured to be disposed on the ribbon supply spindle 230. The ribbon supply roll 208 comprises ink ribbon 202 wound on a ribbon supply spool 204. The ink ribbon supplies the media (e.g., ink) that transfers onto the print media. The printer-verifier 200 may further comprise a thermal printhead 216 utilized to thermally transfer a portion of ink from the ink ribbon 202 to the print media 212 as the ink ribbon is unwound from the ribbon supply spool 204 along a ribbon path (arrow B in FIG. 2A), and the print media 212 is unwound from a media supply spool 214 along a media path (arrow C in FIG. 2A).

A media supply roll 210 comprises the print media 212 wound on the media supply spool 214. A media supply spindle 232 on which the media supply roll 210 is configured to be disposed is contained within the body 218. A ribbon rewind spindle 234 on which unwound ribbon is wound up may also be contained within the body 218. A ribbon take-up 206 may be disposed on the ribbon rewind spindle 234, although the ribbon take-up 206 on the ribbon rewind spindle 234 may not be necessary.

The printer-verifier 200 may further comprise one or more motors for rotating the ribbon supply spindle 230 and the ribbon supply roll 208 disposed thereon (if present) in a forward (arrow A in FIG. 2A) or a backward rotational direction (dependent on the ink surface), for rotating the media supply roll 210 disposed on the media supply spindle 232 in a forward rotational direction, and for rotating the ribbon rewind spindle 234. In a thermal direct printer-verifier, the ribbon supply spool, the ribbon rewind spool, and the ribbon may be eliminated and a thermally sensitive paper replaces the print media. These components are also included in a printer-verifier 200 as hereinafter described.

The printer-verifier 200 may include a GUI 222 for communication between a user and the printer-verifier 200. The GUI 222 may be communicatively coupled to the other components of the printer-verifier for displaying visual and/or auditory information and receiving information from the user (e.g., typed, touched, spoken, etc.). As depicted in FIG. 2A, the body 218 of the printer-verifier 200 may include the GUI 222 with, for example, a display 224 and a keypad 226 with function buttons 228 that may be configured to perform various typical printing functions (e.g., cancel print job, advance print media, and the like) or be programmable for the execution of macros containing preset printing parameters for a particular type of print media. The graphical user interface (GUI) 222 may be supplemented or replaced by other forms of data entry or printer control, such as a separate data entry and control module linked wirelessly or by a data cable operationally coupled to a computer, a router, or the like. The GUI 222 may be operationally/communicatively coupled to a processor (CPU) 220 for controlling the operation of the printer-verifier 200, in addition to other functions. In some embodiments, the user interface may be different from the one depicted in FIG. 2A. In some embodiments, there may not be a user interface.

Referring now to FIG. 2B, an example block diagram of the printer-verifier 200 is shown. The printer-verifier 200 may comprise the processor 220, a memory 240 communicatively coupled to the processor 220, and a power source. The printer may further comprise a communications module 242 communicatively coupled to one or more of the other printer components.

The central processing unit (CPU) (i.e., the processor 220) is the electronic circuitry within a computer that carries out the instructions of a computer program by performing the basic arithmetic, logical, control and input/output (I/O) operations specified by the instructions as hereinafter described. The printer-verifier 200 may be communicatively connected using the communications module 242 to a computer or a network 244 via a wired or wireless data link. In a wireless configuration, the communications module 242 may communicate with a host device over the network 244 via a variety of communication protocols (e.g., WI-FI®, BLUETOOTH®), CDMA, TDMA, or GSM). In accordance with Various example embodiments, the memory 240 is configured to store a print quality verification program 246, a reference image 248, an offset value 250, and a drifting offset value 252 as hereinafter described.

Still referring to FIGS. 2A and 2B, an imaging module 236 is disposed in the printer-verifier 200 and is configured to capture a representation of the printed image (e.g., printed barcode 254 on print medium 212 within a field of view 256), using an image sensor 258 (i.e., the imaging module 236 comprises the image sensor 258) to obtain a captured image. The image sensor 258 comprises a light source 260 for illuminating the field of view. The image sensor 258 uses an imaging lens (or lenses) to form a real image of the field of view 256 on an array of photo sensors (e.g., a linear or 2D array CCD, CMOS sensor, CIS, etc.). Electronic signals from the photo sensors are used to create gray level or color images, which would result in a digital image similar to that which may be obtained by a digital camera.

The processor 220 is further configured to determine a failed printed media and cause the failed printed media to be reprinted in a next available media (e.g., a blank or unused print media) and, based on an the printer operating in a sequential or non-sequential batch printing mode, will cause additional printed media to be voided and reprinted in sequence after the failed printed media.

Referring now to FIG. 3, an example printer 328 communicatively coupled to verifier 302 (also known as "inspection device") in system 300 for printing an image and verifying a print quality of the image is shown. Printer 328 may be similar to the printer-verifier 200 depicted in FIGS. 2A-2B, except that the imaging module of the verifier is separated from the printer in system 300. In this regard, printer 328 has a body for enclosing an interior thereof. The printer 328 further comprises a power source and a moveable cover for accessing the interior. Similar to the printer-verifier 200 described above in connection with FIGS. 2A-2B, the printer 328 may comprise a ribbon supply spindle contained within the body. A ribbon supply roll is configured to be disposed on the ribbon supply spindle. The ribbon supply roll ink ribbon wound on a ribbon supply spool. The ink ribbon supplies the media (e.g., ink) that transfers onto the print media.

Similar to the printer-verifier 200 described above in connection with FIGS. 2A-2B, the printer 328 may further comprise a thermal printhead utilized to thermally transfer a portion of ink from the ink ribbon to the print media, as the ink ribbon unwinding from the ribbon supply spool along a ribbon path and the print media unwinding from a media supply spool along a media path. A media supply roll comprises the print media wound on the media supply spool. A media supply spindle (on which the media supply roll is configured to be disposed) is contained within the body. A ribbon rewind spindle on which unwound ribbon is wound up may also be contained within the body. A ribbon take-up may be disposed on the ribbon rewind spindle, although the ribbon take-up on the ribbon rewind spindle may not be necessary.

The printer 328 may further comprise one or more motors for rotating the ribbon supply spindle and the ribbon supply roll disposed thereon (if present) in a forward or a backward rotational direction (dependent on the ink surface), for rotating the media supply roll disposed on the media supply spindle in a forward rotational direction, and for rotating the ribbon rewind spindle. In a direct transfer printer-verifier, the ribbon supply spool, the ribbon rewind spool, and the ribbon may be eliminated and a thermally sensitive paper substituted for the print media.

Similar to the printer-verifier 200 described above in connection with FIGS. 2A-2B, the printer 328 may further comprise a processor, a memory communicatively coupled to the processor, and a power source. The printer may further comprise a communications module communicatively coupled to one or more of the other printer components. The printer 328 may have a fewer or greater number of components as hereinafter described.

The verifier 302 comprises imaging module 336, a memory (a verifier memory 314) communicatively coupled to the imaging module 336 and a central processing unit (CPU) (herein a "verifier processor" 310 or "inspection device processor") communicatively coupled to the verifier memory 314 and imaging module 336. The verifier 302 may further comprise an I/O module 322 and a verifier communication module 316.

The subsystems in the verifier 302 of FIG. 3 are electrically connected via a coupler (e.g., wires, traces, etc.) to form an interconnection subsystem. The interconnection system may include power buses or lines, data buses, instruction buses, address buses, etc., that allow operation of the modules/subsystems and the interaction there between. The I/O module 322 may include a verifier graphical user interface. In various embodiments, the verifier 302 may be communicatively connected using the verifier communication module 316 to the computer or the network 318 via a wired or wireless data link. In a wireless configuration for the wireless data link, the verifier communication module 316 may communicate with a host device, such as the computer, or the network 318, via a variety of communication protocols (e.g., WI-FI®, BLUETOOTH®, NFC®, RFID®), CDMA, TDMA, or GSM). The verifier memory 314 may store a print quality verification program 320, the reference image 323, the offset 324, and the drifting offset 326.

While FIG. 3 depicts a verifier memory 314 and a verifier processor 310 in the verifier 302, it is to be understood that only the printer 328 or only the verifier 302, or both the printer 328 and verifier 302 communicatively coupled thereto may comprise the memory and the processor for executing the steps as hereinafter described (i.e., at least one of the verifier and the printer comprises a memory communicatively coupled to the imaging module and a processor communicatively coupled to the imaging module and memory). The verifier 302 that is attached to the printer may rely on the memory and the processor of printer for executing the steps as hereinafter described while the verifier 302 that is a standalone device has its own verifier memory 314 and verifier processor 310 for executing the steps as hereinafter described. Additionally, or alternatively, the printer may rely on the verifier memory 314 and the verifier processor 310 of verifier 302 attached to the printer for executing the steps as hereinafter described.

The imaging module 336 disposed in verifier 302 is configured to capture the representation of the printed image (e.g. the printed barcode 301 on the print media 312 in FIG. 3) within a field of view 303, using the image sensor 304 (i.e., the imaging module 336 comprises the image sensor 304). The image sensor 304 comprises the light source 306 for illuminating the field of view. The image sensor 304 uses an imaging lens (or lenses) to form a real image of the field of view 303 on an array of photo sensors (e.g., a linear or 2D array CCD, CMOS sensor, CIS device, etc.). Electronic signals from the photo sensors are used to create gray level or color images, e.g., which would result in a digital image that may be obtained by a digital camera.

While a thermal transfer printer-verifier and printer are described, it is to be understood that Various example embodiments may be used in other types of printers (e.g., ink-drop printer, laser-toner printer, etc.). It is also to be understood that the print media can be supplied from other than a media supply spindle (e.g., in a "fan-fold" configuration).

III. Example Method for Implementing Example Embodiments

Figure 4A:
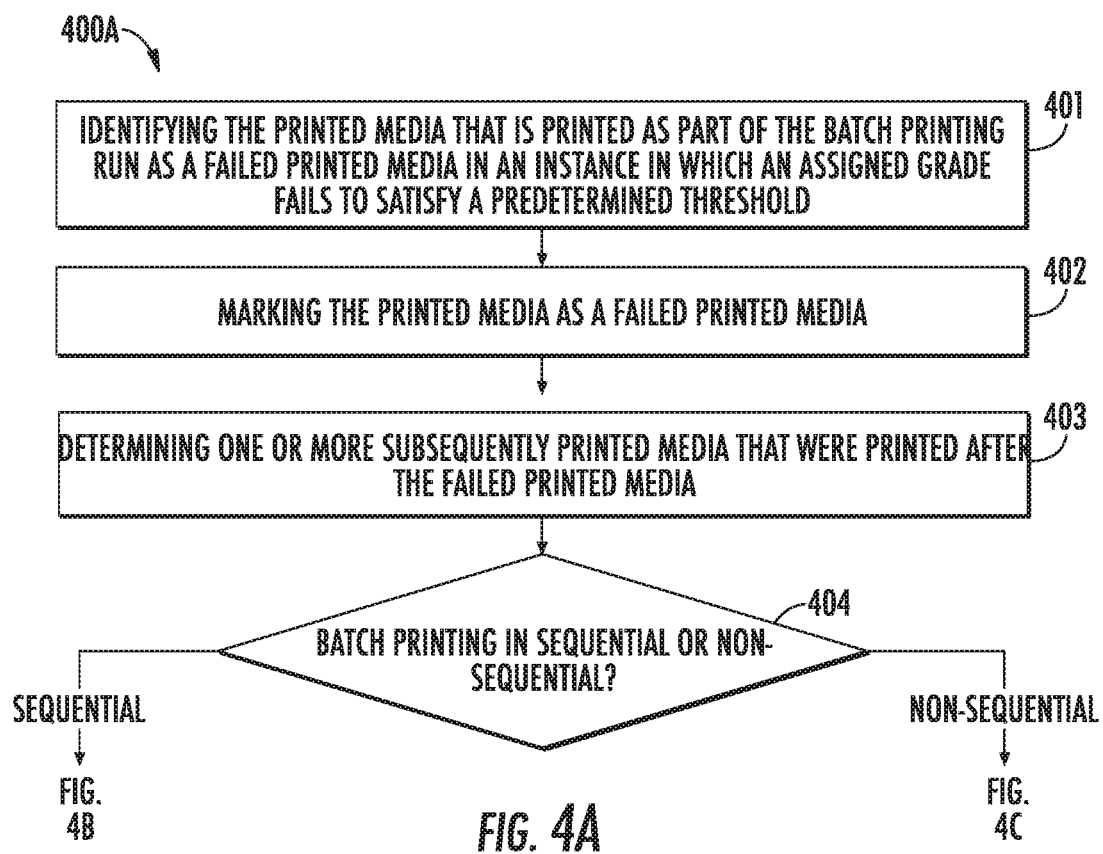
FIGS. 4A, 4B, and 4C are flowcharts of exemplary methods for robust voiding and reprinting in a batch printing run, according to various example embodiments.
Figure 4B:
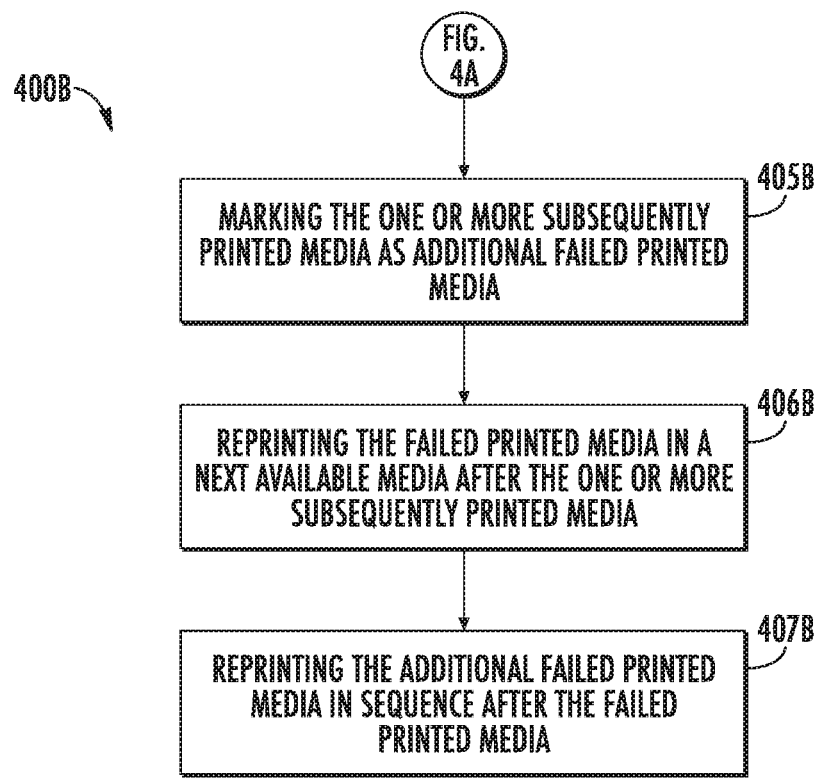
Figure 4C:
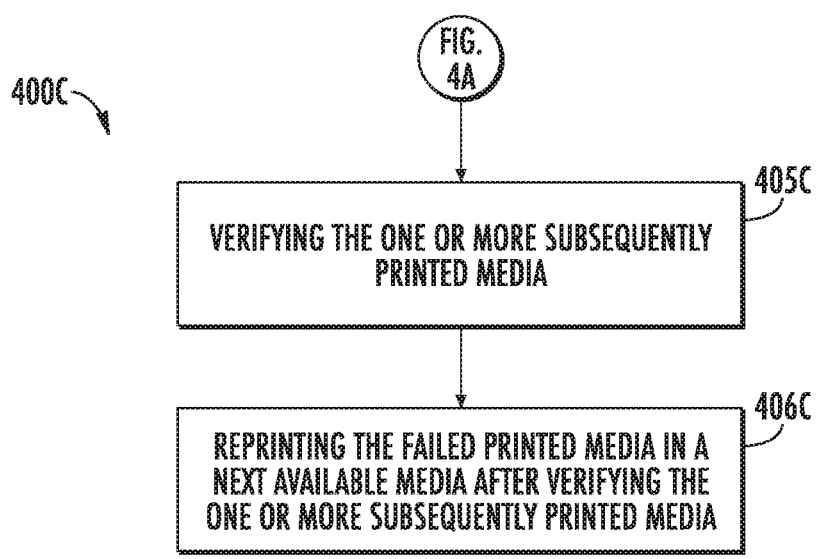

FIGS. 4A, 4B, and 4C are flowcharts of exemplary methods for robust voiding and reprinting in a batch printing run, using printer-verifier 200. The methods and flowcharts highlight the steps of an exemplary embodiment. Indeed, exemplary methods 400A, 400B, and 400C illustrates printing of print media in a batch mode (e.g., two or more print media in a print job or print run).

It will be understood that exemplary methods 400A, 400B, and 400C are performed by a hardware processor (such as by processor 220 or verifier processor 310) of an exemplary printer, in conjunction with or controlled by suitable computer code which implements the method. The code may be encoded directly into either of the logic of processor 220 or 310, or may be stored as firmware in a static memory (such as static memory 240), or may be part of device driver code stored (for example, volatile printer raster memory). In an alternative embodiment, the methods 400A, 400B, and 400C may be performed in whole or in part by a hardware processor of an external computer which is linked to a printer by a suitable wired or wireless communications means.

Method 400A begins with step 401, where the printer-verifier 200 (such as by processor 220 or verifier processor 310) identifies the printed media that is printed as part of the batch printing run as a failed printed media in an instance an assigned grade fails to satisfy a predetermined threshold. In an example embodiment, to determine printed media as a failed printed media, the printer-verifier 200 scans, with a verifier, printed media after it is output from a printhead to generate at least a portion of a printed image. Based on the printed image, the printer then determines an assigned grade for the at least a portion of the printed image.

In some examples, the printer-verifier 200 determines the assigned grade for the at least a portion of the printed image by detecting barcode symbols of the at least a portion of the printed image to obtain a scan reflectance profile and thereafter, calculating, using the scan reflectance profile, a grade against a plurality of quality parameters comprising a decode parameter, symbol contrast, minimum reflectance, edge contrast, modulation, defects, and decodability. In some examples, the step of calculating the grade alternatively or additionally comprises analyzing one or more barcode quality parameters of a printed barcode from the scanned image and comparing the results against a barcode print quality standard such as a barcode print quality standard set forth in the ISO/IEC 15415, 29158, or 15416 barcode print quality test specifications.

The parameters of barcode quality affect the quality of the printed barcode and are based on the optics of bar code scanning systems. Barcode print quality parameters may include, among other parameters, a modulation parameter and a defects parameter. Each quality parameter will either Pass, Fail, or be graded. Both the modulation parameter and the defects parameter may be graded.

In addition to evaluating barcode print quality for meeting a print quality standard based on, for example, ANSI/CEN/ISO guidelines, the evaluation of barcode quality includes matching a printing application requirement such as a customer specification. Dependent on the printing application requirement, higher or lower modulation grades and/or defects grades may be required.

Returning to method 400A, in step 402, the printer-verifier 200 (such as by processor 220 or verifier processor 310) is configured to cause the printer to mark the printed media as the failed printed media. For example, in some embodiments, the printer-verifier 200 may cause one or more void marks to be printed over portions of the printed media. In an embodiment, marking the printed media as a failed printed media comprises printing a voiding pattern over or adjacent to the at least a portion of the printed image, wherein the voiding pattern is configured to render the at least a portion of the printed image unreadable by an automated reading device while only minimally obscuring the at least a portion of the printed image for visual inspection. In embodiments, the failed printed media may be retracted back into the printer and branded with the one or more void marks, after which a next print media is printed by the printer.

In step 403 of method 400A, the printer-verifier 200 (such as by processor 220 or verifier processor 310) determines one or more subsequently printed media that were printed after the failed printed media. The one or more subsequently printed media are determined based on one or more predetermined distances. For example, a distance between a printhead and a verifier and/or a tear bar. In some examples, the one or more subsequently printed media are determined based on the print media size (e.g., label size or paper size).

In an example embodiment, the printer-verifier 200 determines a distance between a print head and the verifier, determines the media size, and identifies the one or more subsequently printed media based on the distance between the print head and the verifier and the media size. In other words, the printer-verifier 200 is configured to deduce the number of subsequently printed media based on the distance between the print head and the verifier. Alternatively or additionally, the one or more subsequently printed media may be determined based on a count of printed media, a current print media in the sequence (e.g. a difference between the printed media number in sequence that failed and the print media number in sequence that is currently being printed or recently was printed). Alternatively or additionally, a next available media may be identified by the printer-verifier 200 and any preceding print media may be identified as the one or more subsequently print media.

In step 404A, the printer-verifier 200 (such as by processor 220 or verifier processor 310) determines whether the batch print run is in sequential mode or non-sequential mode. In some example embodiments, the printer-verifier 200 determines whether the batch print run is in sequential mode or non-sequential mode whereas in alternative or additional embodiments, the mode is set by a user, is set as part of a print job or print run, and/or is predetermined based on a number of print media.

FIG. 4B illustrates the subsequent operations in response to determining that the printer-verifier is in sequential mode, the operations proceeding to follow FIG. 4A in reference to connector 4A. In step 405B, the printer-verifier 200 (such as by processor 220 or verifier processor 310) additionally marks the one or more subsequently printed media as additional failed printed media. The printer-verifier 200 may then cause the failed printed media to be printed in sequence after the one or more subsequently printed media and on the next available media as shown in step 406B. The printer-verifier 200 is further configured to reprint the additional failed printed media in sequence after the failed printed media as shown in step 407B. That is, in sequential mode, the failed printed media is voided and any subsequent printed media are voided so that the sequence of the print job can be maintained starting with the failed printed media in the next available media.

FIG. 4C illustrates the subsequent operations in response to determining that the printer-verifier is in non-sequential mode, the operations proceeding to follow FIG. 4A in reference to connector 4A. In step 405C, the printer-verifier 200 verifies the one or more subsequently printed media. In embodiments, verifying the one or more subsequently printed media is needed because the one or more subsequently printed media may have changed or may not yet have been verified. In an example embodiment, the printer-verifier 200 verifies the print quality of the printed image on the print media and determines the assigned grade for the printed image. In step 406C, the printer-verifier 200 reprints the failed printed media in a next available media after verifying the one or more subsequently printed media. That is, the failed printed media is printed at the next available print media, such as is shown in FIG. 5B.

Referring now to FIGS. 5A and 5B, which illustrate some elements of an exemplary printer-verifier 200 (referred to generally herein as printer-verifier 200) in a schematic view, according to the present system and method. For example, the printer-verifier 200 may comprise a print head, a verifier (also known as "inspection device"), and a tear bar. The print head is configured to print a plurality of sequential dots onto each of a corresponding plurality of sequential segments of a media. For example, the print head prints new text/new graphics on a print media (e.g., label), based on a rasterized image, resulting in a printed label (e.g., printed media). The verifier, as described herein, is configured by the print quality verification program to execute processes to control the print quality of the printed barcode. The tear bar is used to tear a paper strip into multiple pieces, such as in the form of labels, each label having a barcode image.

Returning to FIG. 5A, FIG. 5A illustrates an example embodiment illustrating the printer operating in a sequential mode. As is illustrated, "Label #1" (502A) is identified as failed meaning that Label #1 (502A) was assigned a grade by the printer-verifier that failed to satisfy a predetermined threshold. The printer-verifier 200 will then mark Label #1 (502A) as a failed printed media. As can be seen in before 501A, a plurality of subsequently printed labels 503A have been printed before "Label #1" (502A) was identified as failed. Label 504A is the next available label as it has not yet reached the printhead.

According to example embodiments described in this disclosure and as shown in after 511A, the printer-verifier 200 is configured to determine or otherwise identify the one or more subsequently printed labels 513A (e.g., three labels) after the failed print media 512A and marks those labels as voided or failed. As disclosed herein, the one or more subsequently printed media labels 513A are determined based on one or more pre-determined distances. For example, a distance between a printhead and a verifier and/or a tear bar. In some examples, the one or more subsequently printed labels 513A may be determined based on a count of printed media. After the print head prints text/graphics on the label, the printer-verifier 200 then increments the printed media count and stores the printed media count data in a memory, for example, memory 240.

The printer-verifier 200 is then configured to cause the failed print media 512A to be reprinted in sequence at the next available label 514A. The one or more subsequently printed labels 513A may be reprinted in sequence after next available label 514A.

FIG. 5B illustrates an example embodiment illustrating the printer operating in a non-sequential mode. As is illustrated, "Label #1" (502B) is identified as failed meaning that Label #1 (502B) was assigned a grade by the printer-verifier that failed to satisfy a predetermined threshold. The printer-verifier 200 will then mark Label #1 (502B) as a failed printed media. As can be seen in before 501B, a plurality of subsequently printed labels 503B have been printed before "Label #1" (502B) was identified as failed. Label 504B is the next available label as it has not yet reached the printhead.

According to example embodiments described in this disclosure and as shown in after 511B, the printer-verifier 200 is configured to determine or otherwise identify the one or more subsequently printed labels 513B (e.g., three labels) after the failed print media 512B. However, in non-sequential mode, the one or more subsequently printed labels 513B are not marked as voided or failed. Instead, under non-sequential mode operations the printer-verifier 200 is configured to verify the one or more subsequently printed labels. The printer-verifier 200 is then configured to cause the failed print media 512B to be reprinted in sequence at the next available label 514B.

IV. Additional Implementation Details

In the specification and figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary data structures, and examples. Insofar as such block diagrams, flow charts, schematics, exemplary data structures, and examples contain one or more functions and/or operations, each function and/or operation within such block diagrams, flowcharts, schematics, exemplary data structures, or examples can be implemented, individually and/or collectively, by a wide range of hardware, software, firmware, or virtually any combination thereof.

In one embodiment, the present subject matter may be implemented via Application Specific Integrated Circuits (ASICs). However, the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof.

In addition, those skilled in the art will appreciate that the control mechanisms taught herein are capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined to provide further embodiments. These and other changes can be made to the present systems and methods in light of the above-detailed description. Accordingly, the invention is not limited by the disclosure, but instead its scope is to be determined by the following claims.

The invention claimed is:

1. A method for voiding a printed media in a batch printing run, the method comprising:
   identifying the printed media that is printed as part of the batch printing run as a failed printed media in an instance in which an assigned grade fails to satisfy a predetermined threshold;
   marking the printed media as the failed printed media;
   determining one or more subsequently printed media that were printed after the failed printed media; and
   reprinting the failed printed media in a next available media after the one or more subsequently printed media.

2. The method according to claim 1 further comprising:
   scanning, with an inspection device, the printed media to generate at least a portion of a printed image; and
   determining the assigned grade for the at least the portion of the printed image.

3. The method according to claim 2, wherein marking the printed media as the failed printed media comprises printing a voiding pattern over or adjacent to the at least the portion of the printed image, wherein the voiding pattern is configured to render the at least the portion of the printed image unreadable by an automated reading device while only minimally obscuring the at least the portion of the printed image for visual inspection.

4. The method according to claim 1, further comprising:
   marking the one or more subsequently printed media as additional failed printed media; and
   reprinting the additional failed printed media in sequence after the failed printed media before continuing the batch printing run.

5. The method according to claim 1, further comprising scanning, with an inspection device, the printed media to generate at least a portion of a printed image, wherein the at least the portion of the printed image comprises a barcode.

6. The method according to claim 5, wherein determining the assigned grade for the at least the portion of the printed image comprises:
   detecting barcode symbols of the at least the portion of the printed image to obtain a scan reflectance profile; and
   calculating, using the scan reflectance profile, a grade against a plurality of quality parameters comprising a decode parameter, symbol contrast, minimum reflectance, edge contrast, modulation, defects, and decodability.

7. The method according to claim 1, further comprising:
   determining a count of the printed media that is printed; and
   identifying the one or more subsequently printed media based on the count of the printed media that is printed.

8. The method according to claim 1, further comprising:
   determining a distance between a print head and an inspection device;
   determining a media size; and
   identifying the one or more subsequently printed media based on the distance between the print head and the inspection device and the media size.

9. An apparatus, comprising:
   a processor; and
   a non-transitory memory including computer program instructions, the non-transitory memory and the computer program instructions configured to, when executed by the processor, cause the apparatus to at least:
   identify a printed media that is printed as part of a batch printing run as a failed printed media in an instance in which an assigned grade fails to satisfy a predetermined threshold;
   mark the printed media as the failed printed media;
   determine one or more subsequently printed media that were printed after the failed printed media; and
   reprint the failed printed media in a next available media after the one or more subsequently printed media.

10. The apparatus according to claim 9, wherein the non-transitory memory including the computer program instructions is further configured to, when executed by the processor, cause the apparatus to select a decoding algorithm from a plurality of decoding algorithms each configured to:
    scan, with an inspection device, the printed media to generate at least a portion of a printed image; and
    determine the assigned grade for the at least the portion of the printed image.

11. The apparatus according to claim 10, wherein the non-transitory memory including the computer program instructions is further configured to, when executed by the processor, cause the apparatus to print a voiding pattern over or adjacent to the at least the portion of the printed image, wherein the voiding pattern is configured to render the at least the portion of the printed image unreadable by an automated reading device while only minimally obscuring the at least the portion of the printed image for visual inspection.

12. The apparatus according to claim 9, wherein the non-transitory memory including the computer program instructions is further configured to, when executed by the processor, cause the apparatus to:
    mark the one or more subsequently printed media as additional failed printed media; and
    reprint the additional failed printed media in sequence after the failed printed media.

13. The apparatus according to claim 9, wherein the non-transitory memory including the computer program instructions is further configured to, when executed by the processor, cause the apparatus to scan, with an inspection device, the printed media to generate at least a portion of a printed image, wherein the at least the portion of the printed image comprises a bar code.

14. The apparatus according to claim 9, wherein the non-transitory memory including the computer program instructions is further configured to, when executed by the processor, cause the apparatus to:
   determine a distance between a print head and an inspection device;
   determine a media size; and
   identify the one or more subsequently printed media based on the distance between the print head and the inspection device and the media size.

15. The apparatus according to claim 9, wherein the non-transitory memory including the computer program instructions is further configured to, when executed by the processor, cause the apparatus to:
   determine a count of the printed media that is printed; and
   identify the one or more subsequently printed media based on the count of the printed media that is printed.

16. A printer comprising:
   a print verification device configured to monitor print quality of images printed onto a print media, wherein the print verification device is configured to identify a printed media that is printed as part of a batch printing run as a failed printed media in an instance in which an assigned grade fails to satisfy a predetermined threshold;
   a printing mechanism configured to print the images onto the print media, wherein the printing mechanism is configured to mark the printed media as the failed printed media and reprint the failed printed media in a next available media after one or more subsequently printed media; and
   a processor configured to determine the one or more subsequently printed media that were printed after the failed printed media.

17. The printer according to claim 16, wherein the print verification device is further configured to:
   scan the printed media to generate at least a portion of a printed image; and
   determine the assigned grade for the at least the portion of the printed image.

18. The printer according to claim 17, wherein the print verification device is further configured to:
   detect barcode symbols of the at least the portion of the printed image to obtain a scan reflectance profile; and
   calculate, using the scan reflectance profile, a grade against a plurality of quality parameters comprising a decode parameter, symbol contrast, minimum reflectance, edge contrast, modulation, defects, and decodability.

19. The printer according to claim 16, wherein the printing mechanism is further configured to:
   mark the one or more subsequently printed media as additional failed printed media; and
   reprint the additional failed printed media in sequence after the failed printed media.

20. The printer according to claim 16, wherein the print verification device is further configured to scan the printed media to generate at least a portion of a printed image, wherein the at least the portion of the printed image comprises a bar code.

* * * * *